(12) United States Patent
Weikel

(10) Patent No.: US 8,135,574 B2
(45) Date of Patent: Mar. 13, 2012

(54) CREATING AND DISPLAYING BODIES OF PARALLEL SEGMENTED TEXT

(76) Inventor: Bryan T. Weikel, Austin, TX (US)

( * ) Notice: Subject to any disclaimer, the term of this patent is extended or adjusted under 35 U.S.C. 154(b) by 688 days.

(21) Appl. No.: 12/271,076

(22) Filed: Nov. 14, 2008

(65) Prior Publication Data

US 2009/0132234 A1 May 21, 2009

Related U.S. Application Data

(60) Provisional application No. 60/988,419, filed on Nov. 15, 2007.

(51) Int. Cl.
*G06F 17/28* (2006.01)

(52) U.S. Cl. ............... 704/3; 704/5; 704/7; 704/2; 704/1

(58) Field of Classification Search .................. 704/3, 5, 704/7, 2, 1
See application file for complete search history.

(56) References Cited

U.S. PATENT DOCUMENTS

| | | | |
|---|---|---|---|
| 4,891,011 A | 1/1990 | Cook | |
| 5,145,376 A | 9/1992 | Krass | |
| 5,178,542 A | 1/1993 | Chigrinsky et al. | |
| 5,275,569 A | 1/1994 | Watkins | |
| 5,486,111 A | 1/1996 | Watkins | |
| 5,608,622 A * | 3/1997 | Church | 704/3 |
| 5,697,789 A | 12/1997 | Sameth et al. | |
| 5,713,739 A | 2/1998 | Yu | |
| 5,754,840 A | 5/1998 | Rivette et al. | |
| 5,799,325 A | 8/1998 | Rivette et al. | |
| 5,806,079 A | 9/1998 | Rivette et al. | |
| 5,809,318 A | 9/1998 | Rivette et al. | |
| 5,845,301 A | 12/1998 | Rivette et al. | |
| 5,848,409 A | 12/1998 | Ahn | |
| 5,882,202 A | 3/1999 | Sameth et al. | |
| 5,956,034 A | 9/1999 | Sachs et al. | |
| 5,991,751 A | 11/1999 | Rivette et al. | |

(Continued)

FOREIGN PATENT DOCUMENTS

EP 1 126 389 A1 8/2001

(Continued)

OTHER PUBLICATIONS

Business Wire, "Fonix Language Learning Speech Solution Selected by Brilliant System for Electronic Dictionary," Business Wire, Dec. 6, 2006, Gale Group New Product Announcements/Plus®, Dialog®, File No. 621, Accession No. 4858959, pp. 1-3.

(Continued)

*Primary Examiner* — Qi Han
(74) *Attorney, Agent, or Firm* — Schubert Law Group PLLC

(57) ABSTRACT

Computer program products and arrangements of creating and displaying bodies of parallel segmented text are discussed. The bodies of parallel text may be divided into matching segments. Embodiments include transformations, code, state machines or other logic to display in separate areas one or more segments of text from each body of text. The embodiment may involve emphasizing one segment of text from each body. The emphasized segments may match. The text from one of the bodies may include two or more segments. The embodiment may include receiving from a user a command to emphasize a different segment within the one body of text. The embodiment may involve presenting a second display of text in response to the command. The second display may include the different segment and matching segments in the other bodies of text. The different segment and the matching segments may be emphasized.

1 Claim, 14 Drawing Sheets

U.S. PATENT DOCUMENTS

| | | | |
|---|---|---|---|
| 5,991,780 | A | 11/1999 | Rivette et al. |
| 6,012,073 | A * | 1/2000 | Arend et al. ............... 715/236 |
| 6,018,749 | A | 1/2000 | Rivette et al. |
| 6,308,187 | B1 | 10/2001 | DeStefano |
| 6,370,498 | B1 | 4/2002 | Flores et al. |
| 6,389,434 | B1 | 5/2002 | Rivette et al. |
| 6,438,515 | B1 | 8/2002 | Crawford et al. |
| 6,473,729 | B1 * | 10/2002 | Gastaldo et al. ............... 704/4 |
| 6,564,186 | B1 * | 5/2003 | Kiraly et al. ............... 704/260 |
| 7,085,707 | B2 | 8/2006 | Milner |
| 7,168,038 | B2 | 1/2007 | Lui et al. |
| 7,219,309 | B2 | 5/2007 | Kaasila et al. |
| 7,239,842 | B2 | 7/2007 | Nijim |
| 2002/0165880 | A1 | 11/2002 | Hornsby et al. |
| 2003/0018670 | A1 | 1/2003 | Ashford et al. |
| 2003/0182628 | A1 | 9/2003 | Lira |
| 2004/0039750 | A1 | 2/2004 | Anderson et al. |
| 2004/0261016 | A1 | 12/2004 | Glass et al. |
| 2005/0055632 | A1 | 3/2005 | Schwartz et al. |
| 2005/0066267 | A1 | 3/2005 | Kanai |
| 2005/0193330 | A1 | 9/2005 | Peters |
| 2008/0034282 | A1 * | 2/2008 | Zernik ............... 715/229 |

FOREIGN PATENT DOCUMENTS

| | | |
|---|---|---|
| EP | 1 132 829 A2 | 9/2001 |
| WO | WO 98/55945 | 12/1998 |
| WO | WO 03/081458 A1 | 10/2003 |
| WO | WO 2006/015362 A2 | 2/2006 |
| WO | WO 2006/022658 A1 | 3/2006 |
| WO | WO 2006/096139 A1 | 9/2006 |

OTHER PUBLICATIONS

Business Wire, "Language Line Services and PimsleurDirect Launch New On-Demand Language Learning Practice Service Using Professional Interpreters Over the Phones," Business Wire, Jan. 31, 2007, Gale Group New Product Announcement/Plus®. Dialog® File No. 621, Accession No. 4910699, pp. 1-3.

Business Wire, "Research and Markets: Language Translation—Market Opportunities, Strategies, and Forecasts, 2007 to 2013," Business Wire, Sep. 17, 2007, Gale Group New Product Announcements/Plus®, Dialog®, File No. 621, Accession No. 5150874, pp. 1-5.

Business Wire, "WordChamp's Web Reader Transforms Any Website or Document into a Language Learning Resource," Business Wire, Oct. 25, 2006, Gale Group New Product Announcements/Plus®, Dialog®, File No. 621, Accession No. 4799911, pp. 1-3.

Campbell, Dermot, "Gaining in the Translation: Delivering an online translation course," School of Languages, Dublin Institute of Technology, Dublin-8 Ireland, staffweb.itsligo.ie/staff/bmulligan/EdTech2004/papers/campbelldermot.doc.,pp. 1-4.

De Ridder, Isabelle, "Visible or Invisible Links: Does the Highlighting of Hyperlinks Affect Incidential Vocabulary Learning, Text Comprehension, and the Reading Process?," Language Learning & Technology, http://llt.msu.edu/vol6num1/deridder/, Jan. 2002, vol. 6, No. 1, pp. 123-146.

PR Newswire, "Livemocha Revolutionizes Language Learning Market with New Social Networking Based Approach," PR Newswire, Sep. 24, 2007. Gale Group New Product Announcements/Plus®, Dialog®, File No. 621, Accession No. 5158757, pp. 1-3.

Robinson, A.C., "Highlighting Techniques to Support Geovisualization," Date: 2007, http://www.personal.psu.edu/acr181/ACR_ICAVIS_06_Submitted.pdf ,pp. 1-18.

Wu, J.C., et al., "TotalRecall: A Bilingual Concordance for Computer Assisted Translation and Language Learning," Proceedings of the 41st Association of Computational Linguistics, Jul. 2003, http://aclweb.org/anthology-new/P/P03/P03-2040.pdf , pp. 201-204.

* cited by examiner

FIG. 1

| (Left) | (Right) |
|---|---|
| "Wait'll you see my new bike! It's a red and black BMX racer, with a shotgun-style saddle, snake-belly tires and cobra grips!" | estilo escopeta, con neumáticos de panza de serpiente y empuñaduras de cobra!" |
| Wednesday was John's tenth birthday. At dinner that night his grandmother gave him a twenty-dollar bill. His father and mother gave him a racing bike. As soon as he finished his birthday cake John called up his best friend Mike and told him all about it | El miércoles fue el cumpleaños número diez de John. En la cena, esa misma noche, su abuela le dio un billete de veinte dólares. Su mamá y su papá le regalaron una bicicleta de carrera. Apenas terminó su torta de cumpleaños, John llamó a su mejor amigo |

| Bottom | Prev | Next | Top |

FIG. 3
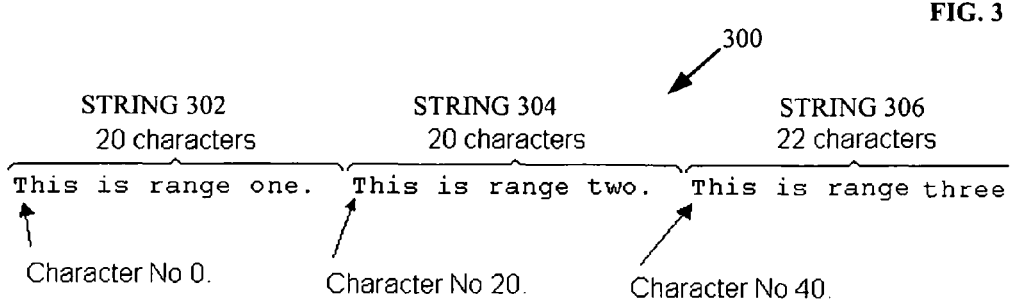
STRING 302 — 20 characters
STRING 304 — 20 characters
STRING 306 — 22 characters
This is range one. This is range two. This is range three
Character No 0.   Character No 20.   Character No 40.
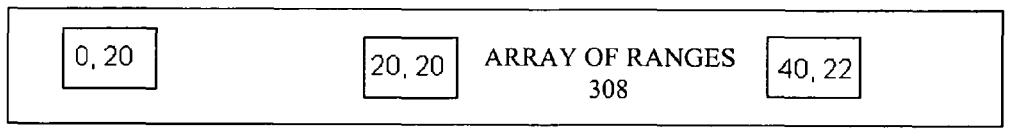
0, 20    20, 20   ARRAY OF RANGES 308    40, 22
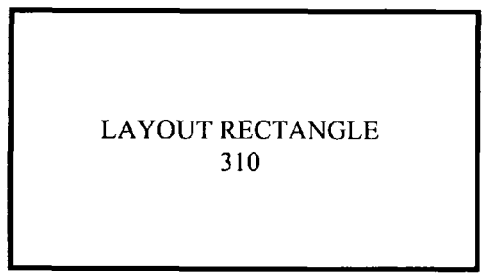
LAYOUT RECTANGLE 310
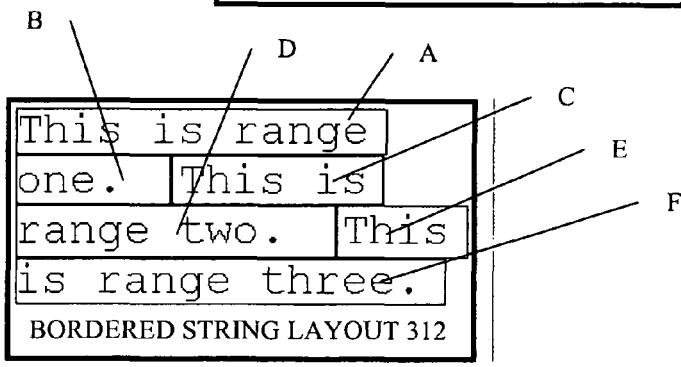
BORDERED STRING LAYOUT 312
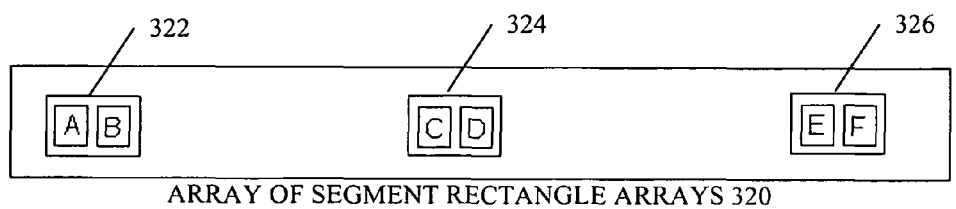
322   324   326
A B    C D    E F
ARRAY OF SEGMENT RECTANGLE ARRAYS 320

CREATING AND DISPLAYING BODIES OF PARALLEL SEGMENTED TEXT

CROSS-REFERENCE TO RELATED APPLICATIONS

This patent application claims priority under provisional Patent Application 60/988,419 filed on Nov. 15, 2007, the entire contents of which are hereby incorporated by reference.

FIELD

The present invention is in the field of text processing. More particularly, the present invention relates to methods and arrangements to create and display bodies of parallel segmented text.

BACKGROUND

Bodies of text exist for which it is meaningful to match other bodies of text on approximately a sentence by sentence basis. One example of a set of such bodies of text is an original literary work and a translation of that literary work. Occasionally such matched bodies of text are used by persons learning another language. A simple way to present such matched bodies of text so that it helps an individual advance his or her comprehension of another language is to list each text segment (typically a sentence or phrase) from one of the bodies of text on the left side of a presentation media and each matching segment from one of the other textual bodies on the right side of the presentation media, and to align the text segments horizontally:

| | |
|---|---|
| Now is the time for all good men | Ahora es el tiempo en lo que todos los hombres buenos |
| to come to the aid of their country. | debe ayudar a su pais |

SUMMARY OF THE INVENTION

Methods and arrangements of creating and displaying text from bodies of parallel text are presented. The bodies of parallel text may be divided into matching segments. One embodiment provides a method of displaying text from bodies of segmented parallel text. The embodiment may involve displaying in separate areas one or more segments of text from each body of text. The embodiment may involve emphasizing one segment of text from each body. The emphasized segments may match. The text from one of the bodies may include two or more segments. The embodiment may include receiving from a user a command to emphasize a different segment within the one body of text. The embodiment may involve presenting a second display of text in response to the command. The second display may include the different segment and matching segments in the other bodies of text. The different segment and the matching segments may be emphasized.

An embodiment may include speaking an emphasized segment. In some embodiments, the bodies of parallel text may consist of text in two or more languages. The matching segments may be segments with substantially equivalent content. In some embodiments, the bodies of parallel text may consist of different versions of text. In some embodiments, the bodies of parallel text may consist of text and annotations. In many embodiments, the separate areas for the display of text from different bodies of text may consist of panes in a window. In some embodiments, the panes may be arranged horizontally. In some embodiments, the panes may be arranged vertically. In further embodiments, the bottom pane may display only a segment matching the emphasized segment. In a few embodiments, the displaying may include keeping bookmarks. A user may set a bookmark or move to a bookmark. The segments may generally consist of between 6 and 50 words. Some segments may extend onto two or more lines. The segments may be made up of phrases and clauses.

BRIEF DESCRIPTION OF THE DRAWINGS

Advantages of the invention will become apparent upon reading the following detailed description and upon reference to the accompanying drawings in which like references may indicate similar elements:

FIG. 1 depicts an embodiment of a display of an exemplary user interface for displaying bodies of segmented parallel text in accordance with embodiments of the invention;

FIG. 3 depicts a flowchart of an example algorithm for representing the location of segments of parallel segmented text;

DETAILED DESCRIPTION OF EMBODIMENTS

Figure 2:
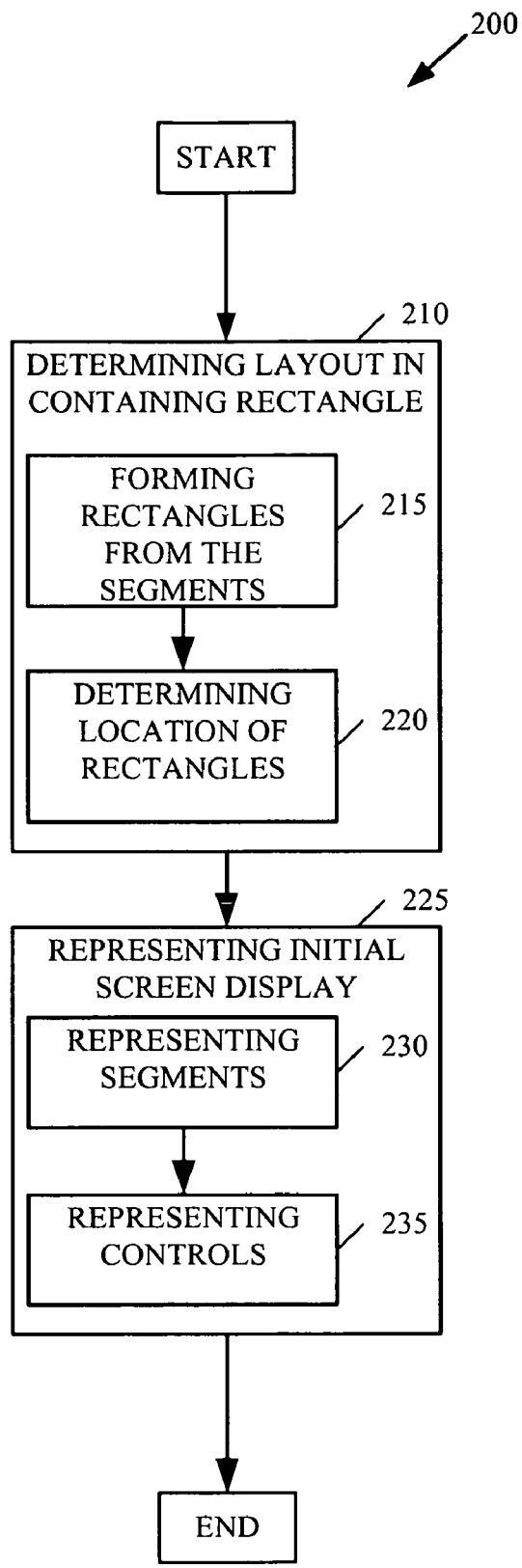
FIG. 2 depicts a flowchart of an example algorithm for initializing data structures for the display of bodies of segmented parallel text.

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements of creating and displaying bodies of segmented parallel text are contemplated. The bodies of parallel text may be divided into matching segments. Embodiments include transformations, code, state machines or other logic to display in separate areas one or more segments of text from each body of text. The embodiment may involve emphasizing one segment of text from each body. The emphasized segments may match. The text from one of the bodies may include two or more segments. The embodiment may include receiving from a user a command to emphasize a different segment within the one body of text. The embodiment may involve presenting a second display of text in response to the command. The second display may include the different segment and matching segments in the other bodies of text. The different segment and the matching segments may be emphasized.

Many embodiments may include speaking the current segment of one of the bodies of parallel text. Several embodiments may include displaying definitions of a word in response to a user hovering a mouse over the word. A few embodiments may set a bookmark when a user moves to a segment that is not near the current segment, such as a segment not visible on the current display.

While specific embodiments will be described below with reference to particular circuit or logic configurations, those of skill in the art will realize that embodiments of the present invention may advantageously be implemented with other substantially equivalent configurations.

Turning to FIG. 1, displayed is an example window 100 that may be produced by a user interface for displaying bodies of segmented parallel text in accordance with embodiments of the invention. Bodies of parallel text are two or more works of text that are related in meaning or in some other manner. The bodies may comprise text with substantially the same meaning in two or more languages, various versions of text, text and annotations or commentary, cases and footnoted materials, or other related texts.

Bodies of segmented parallel text are bodies of parallel text that have been divided into generally corresponding segments or portions. The segments are generally short in comparison to the length of the works, and generally consist of consecutive words. In some embodiments, they may generally consist of sentences, long phrases, or short paragraphs, and may be on average between 6 and 50 words.

The segments from bodies of parallel text may correspond or match in the same way that the bodies correspond. For example, matching segments of a text and translation may consist of a sentence from the text and its translation. In many embodiments, each body of the bodies of text may have the same number of segments and matching segments may have the same index. In further embodiments, the segments of a body of parallel text may be stored as elements in an array of strings, and corresponding segments may have a corresponding index. In some embodiments, a separate array may store the segments of each body of text, and corresponding segments may have identical indices in the arrays. For example, the segments stored in A(14) and B(14) may correspond. In other embodiments, a multidimensional array may store all of the segments. One index of the array may designate the body of text, and another index may designate the segment. For example, A(0, 14) may refer to a segment of the first body, and A(1, 14) may refer to a corresponding segment of the second body.

Example window 100 includes text displays and controls to enable a user to modify the display of the text. The text displays include text-displaying panes 105 and 110. A pane is a subdivision of a window. Left pane 105 and right pane 110 may display portions of text from bodies of parallel segmented text. The portions may be divided into segments. One segment of each pane is highlighted, segment 115 of pane 105 and segment 120 of pane 110. In this specification, the highlighted segment in a pane will be referred to as the current segment. In the example of FIG. 1, the highlighted segments in panes 105 and 110 are corresponding or matching.

Panes 105 and 110 contain scroll bars 145 and 150. By utilizing a mouse cursor on scroll bars 145 and 150, a user may scroll the text of the panes 105 and 110, thereby shifting the text on view in the panes 105 and 110.

Window 100 also contains four control buttons labeled "Bottom" (125), "Prev" (for "previous") (130), "Next" (135), and "Top" (140). Clicking "Next" (button 135) with the mouse cursor may remove the highlight from the current segment in each pane and place it on the following segment of text, thereby making that segment the new current segment. Conversely, clicking "Prev" (button 130) with the mouse cursor may remove the highlight from the current segment in each pane and place it on the previous segment. In either case, the newly highlighted segments of text may correspond. If the entire new current segment is already on display within a pane, the text on display in the pane may remain the same. If, however, the new current segment is not on display in the pane or is clipped, the display window may be scrolled to show the new current segment or as much as will fit within the display window.

Clicking "Top" (button 140) may move the current segments in each pane to the top of the pane. In many cases, the contents of the pane may shift upwards. If a top portion of the current segment in a pane is not visible, however, the contents of the pane may shift downwards. Similarly, clicking "Bottom" (button 125) may move the current segments in each pane to the bottom of the pane. In many cases, the contents of the pane may shift downwards. If a bottom portion of the current segment in a pane is not visible, however, the contents of the pane may shift upwards. If manipulation of the scroll bar has resulted in all or a portion of the highlighted segment being shifted out of view, then either of these buttons may bring the highlighted segment back into view.

Figure 7:
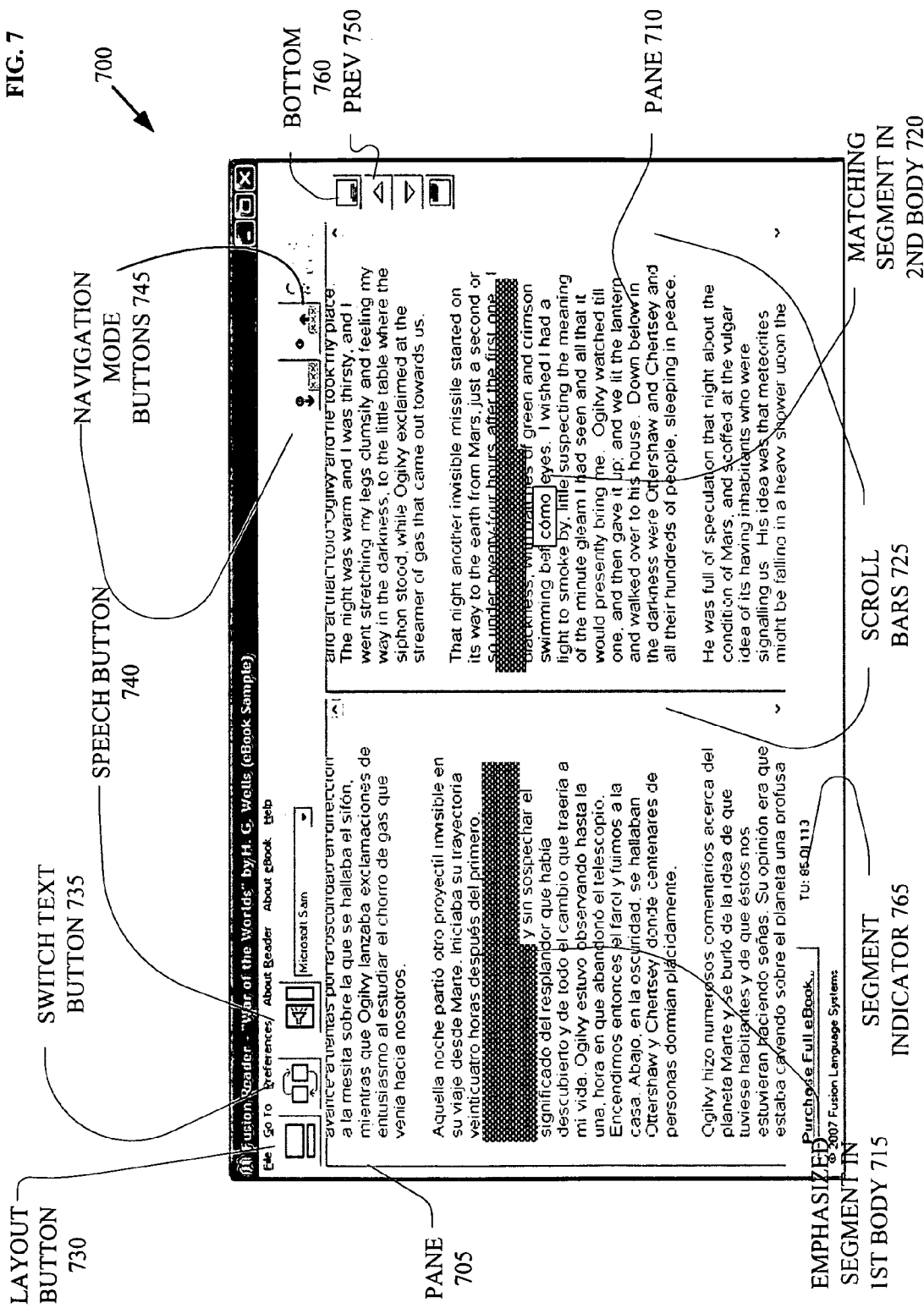
FIG. 7 depicts another embodiment of a display of an exemplary user interface for displaying bodies of segmented parallel text in accordance with embodiments of the invention.

The display of FIG. 1 is for illustration and not limitation. Other embodiments of the invention may use other displays for the presentation of parallel segmented text, as will occur to those of skill in the art. In particular, FIG. 7 presents another example of a display.

FIG. 2 depicts a flowchart 200 of an example algorithm for initializing data structures for the display of bodies of segmented parallel text, such as the display of FIG. 1. The data structures may describe the position of the segments of text inside a display pane or window, designated the segment to be highlighted (current segment), and describe the state of the controls. The algorithm may include determining the layout of the segments in containing rectangles (element 210). A containing rectangle is a rectangle with the same width as the display portion of the window or pane in which the text is to be displayed. The height of the rectangle is sufficient to contain the entire body of text. The method includes forming rectangles from the segments (element 215) and determining the position of the segment rectangles within the containing rectangle for each pane (element 220).

Turning to FIG. 3, depicted is an example elaboration of elements 210 and 215. Diagram 300 illustrates generating a variety of data structures to represent segments of a body of parallel segmented text. The process begins with the set of segments in a body of segmented parallel text. The example of FIG. 3 contains three segments, string 302, string 304, and string 306. The characters in each string are counted and the character ranges are stored. In diagram 300, the storage is as an array of pairs 308. The first element of a pair is the position of the first character of the string in the entire body of text. The second element of the pair is the length of the string. Other representations may be used as may occur to those of skill in the arts. For example, the second element may be the position of the last character of the string. As another example, the representation may simply be of the position of the first character. To calculate the position of the last character of a string, it may suffice to subtract one from the position of the first character of the next string.

The diagram also includes the layout or containing rectangle 310. The process of FIG. 3 includes placing all of the segment strings in the body of segmented parallel text (in the example, strings 302, 304, 306) in the layout rectangle 310, and wrapping the text of the segment strings without regard to segment boundaries. Next, rectangles that describe the placement of the segment strings are calculated, as illustrated by bordered string layout 312.

Several rectangles may be used to enclose a single segment of text. In the example of bordered string layout 312, each segment of text is represented by two rectangles. In many embodiments, one rectangle may be calculated for each line that a segment of text occupies. In other embodiments, a single rectangle may be calculated for multiple consecutive lines with the same horizontal extent, such as multiple complete lines.

Bordered string rectangle layout 314 contains six rectangles, shown in the example of FIG. 3 with labels from A through F. A and B represent the position of string 302; C and D represent the position of string 304; and E and F represent the position of string 306. These values are stored as an array of segment rectangle arrays 320. Each segment is represented by a subarray. In the example of FIG. 3, the display layout of string 302 is represented by subarray 322, of string 304 by subarray 324, and of string 306 by subarray 326. In the example of FIG. 3, each subarray contains the labels of rectangles represented by the subarray.

In many embodiments, the positional information contained in the array of rectangles may describe the position of the rectangles with respect to the top of the layout rectangle 310. In these representations, the shifting of the display from one portion of a body of parallel segmented text to another portion, by itself, may not require a change in representation. In particular, no change may be needed to the representation as a result of a user scrolling the display window or moving from segment to segment within a page. The representation may change, however, if parameters of the display window are changed, such as the width of the window, the size or type of the font, or even the resolution of the display which shows the display window.

Returning to FIG. 2, the algorithm includes representing the initial screen in a display of text from bodies of segmented parallel text (element 225). The algorithm includes representing the text on display in the initial screen (element 230) of a user interface and representing the controls presented by the user interface (element 235). In some embodiments, the text from a body of parallel segmented text on display in the initial screen may be the portion, starting from the beginning of a body, which fits within the display window. The current segment may be the first segment. In other embodiments, the application may redisplay the last portion of the body of text that was on display the last time the application was in use. The current segment may be the segment that was the current segment for that previous display.

Figure 4:
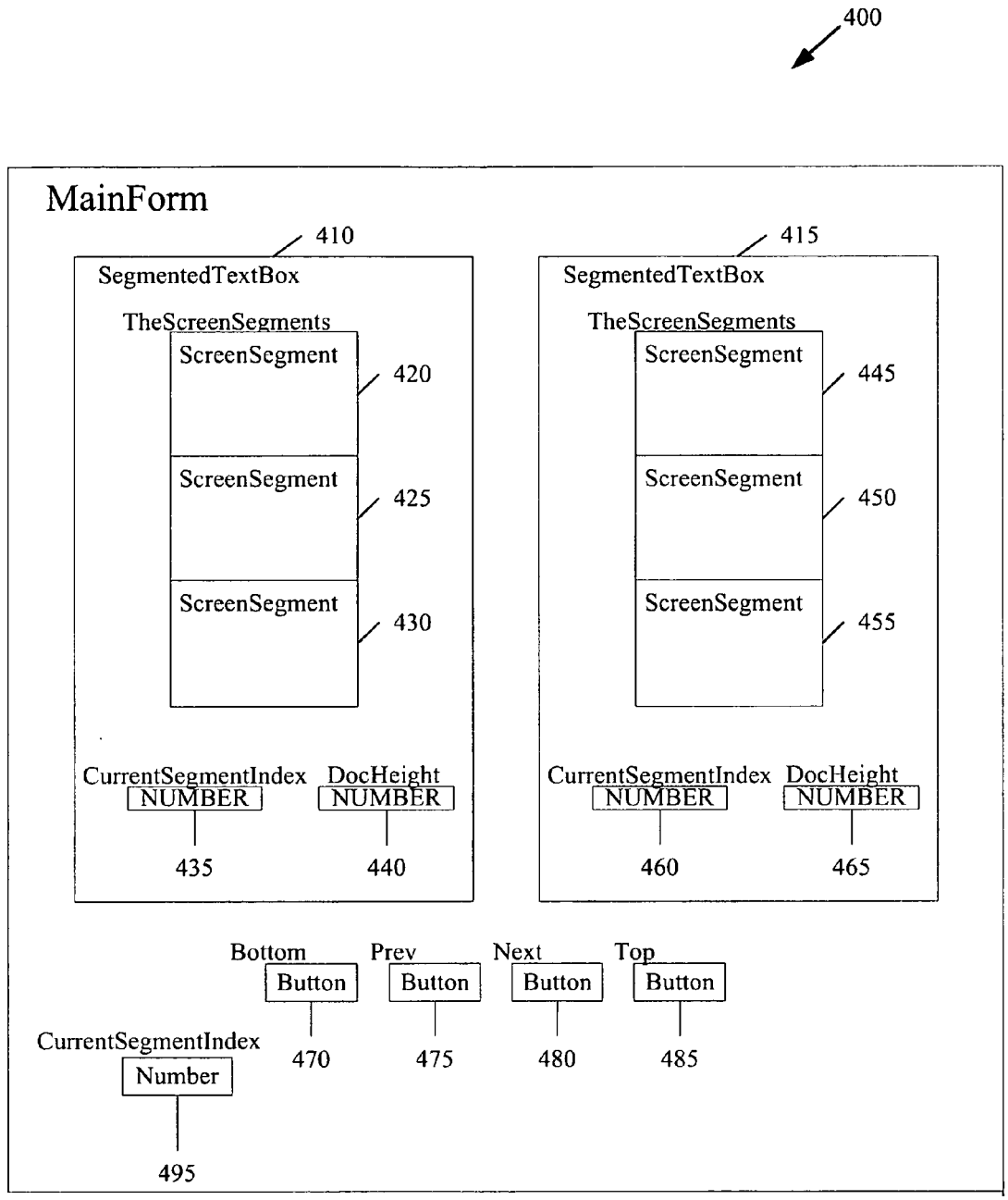
FIG. 4 depicts am embodiment of an example data structure for representing a screen display of segments of bodies of segmented parallel text flowchart.

Turning to FIG. 4, depicted is an example data structure 400 for representing a screen display of segments of bodies of segmented parallel text. MainForm 400 contains data structures representing the segments of text and the state of the controls. MainForm 400 includes SegmentedTextBoxes, 410 and 415, two data structures representing the segments of bodies of parallel text on display in a pane or window of a display of bodies of segmented parallel text. Each SegmentedTextBox (410 and 415) contains three ScreenSegments (420, 425, 430, 445, 450, and 455). The ScreenSegments (420, 425, 430, 445, 450, and 455) represent the text of the segments, the positioning of the segments in the display, and the character range of the text in the segments.

Figure 5:
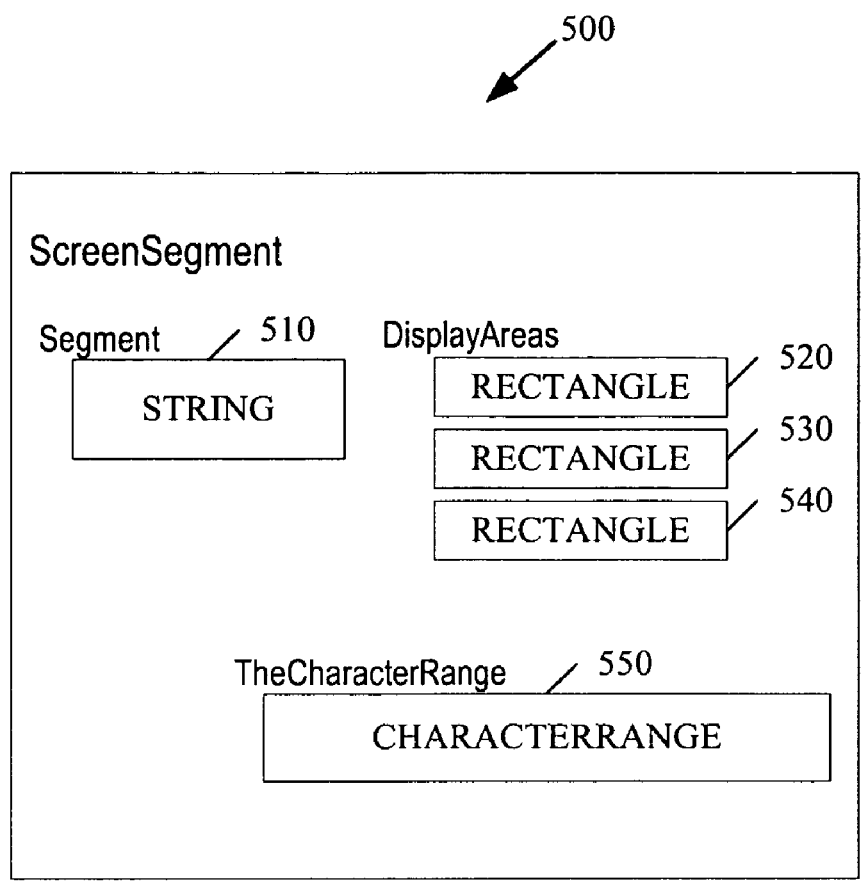
FIG. 5 depicts an exemplary representation of the text and position of a segment of text.

Turning to FIG. 5, ScreenSegment 500 shows in greater detail an exemplary representation of the text and position of a segment of text in the ScreenSegments (420, 425, 430, 445, 450, and 455) of FIG. 4. ScreenSegment 500 contains Segment 510, a string containing the text of the segment. DisplayAreas contains an array of rectangles (520, 530, and 540) representing the layout of the segment in a containing rectangle. This array of rectangles may be generated by the process illustrated by FIG. 3. In the example of FIG. 5, DisplayAreas contain three rectangles. They may represent the layout of the top line of the segments, the middle lines of the segment, and the last line of the segment. Screen segment 500 also includes TheCharacterRange 550, a data structure to represent the character range of the characters contained in the segment. In some embodiments, TheCharacterRange may be implemented as a numerical array with two values. In some embodiments, the values may consist of indices to the first and last character of the segment in the entire string of text of the body of parallel text. In other embodiments, the values may consist of an index to the first character and the total number of characters in the string.

The representation of FIG. 5 is for illustration, and not limitation. Other embodiments of the invention may use representations of the contents and positioning of segments of text as will occur to those of skill in the art. For example, in some representations, a different number of rectangles may represent the layout of a segment. Other representations may not use rectangles at all. The layout of a segment may be represented by the number of the first and last lines of the complete body of text on which the segment appears, and the leftmost position on the first line and rightmost position on the last line. As another example, some embodiments may omit a character range representation. It may be calculated from the string. Other embodiments may use a single number to represent the character range, such as the beginning of the string. The end of the string may be calculated from the beginning of the next string.

Returning to FIG. 4, SegmentedTextBoxes 410 and 415 also include CurrentSegmentIndexes 435 and 460, indexes to the current segment. The current segment may be selected by a user's use of Prev and Next buttons, and may be highlighted when it is positioned in the display pane. In the embodiment of FIG. 4, the index is a number and may consist of the index of the segment in the array of the segments of text in a body of segmented parallel text. In other embodiments, other indices may be used. SegmentedTextBoxes 410 and 415 also includes DocHeight (440 and 465), a number describing the amount of scrolling from the top of the containing rectangle to the portion of text in the display pane or window.

MainForm 400 also contains data structures representing information about the state of the buttons implemented in the user interface. The data structures represent the state of buttons Bottom (470), Prev (for previous) (475), Next (480), and Top (485). The state of the button may represent whether it is currently activated. In addition, MainForm 400 contains CurrentSegmentIndex 495, a data structure representing the index of the current segment. In some embodiments, CurrentSegmentIndex 495 may constitute the primary storage for this value of the index to the current segment, and the similar data structures for each body of text (435 and 460) may be matched to this value.

The data structure of FIG. 4 is for illustration and not limitation. Other embodiments of the invention may use other representations of the text of bodies of parallel segmented text and of user controls for manipulating the display as may occur to those of skill in the art.

Figure 6:
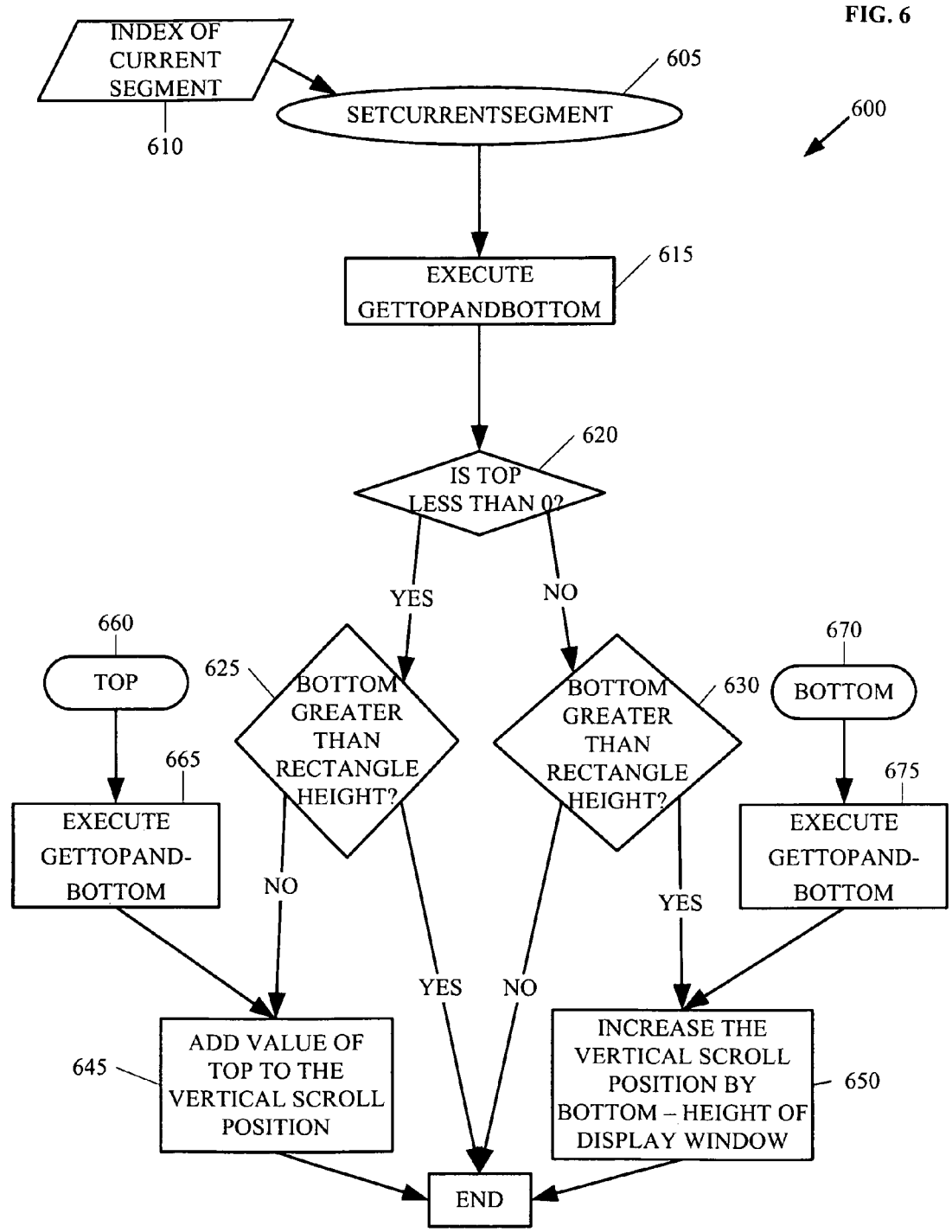
FIG. 6 depicts a flowchart of an exemplary algorithm to modify a display of bodies of segmented parallel text in response to user commands.

FIG. 6 depicts a flowchart 600 of an exemplary algorithm to modify a display of bodies of segmented parallel text in response to user commands. The commands include a command to move the emphasis to a different segment (change the current segment index), and commands to shift the text so that the current segment appears at the top or bottom of the display window. The user commands may be made by interacting with controls such as the buttons (125, 130, 135, 140) of FIG. 1. In addition, the user may scroll a display of text in a body of parallel segmented text by using the scroll bars (145, 150).

In response to a command to set the current segment to the previous segment or the next segment, the SetCurrentSegment function (element 605) may set the current segment as indicated by the command. In addition, the function may scroll the display window in one or both panes to include the current segment within the display window. The function's input is the index of the current segment (element 610). The next-segment command increments the index of the current segment, unless the current segment is the last segment. In that case, the index remains unchanged. Similarly, the previous-segment command decrements the index of the current segment, unless the current segment is the first segment. In that case, the index remains unchanged.

In addition, for each body of text on display, the function may call the GetTopAndBottom function (element 615) to obtain the current vertical placement (position) of the current segment. In some embodiments, the GetTopAndBottom function may examine the rectangles making up the current segment. The function may return the location of the top of the topmost rectangle making up the segment and the location of the bottom of the bottommost rectangle making up the segment. These locations are with respect to the containing rectangle without any scrolling. The function may subtract from each vertically oriented rectangle value the amount that the current display is scrolled down (VerticalScrollPos). The result is the position of the segment relative to the current display window.

The function may then examine the values to determine if the entire segment is displayed within the display window. The function may check if the adjusted position of the top is negative relative to the display window (element 620). A negative value indicates that the top of the segment lies above the segments on display within the display window. In addition, regardless of the result of this test, the function may check whether the adjusted bottom value is greater than the height of the display window (elements 625 and 630). If so, then at least some of the segment is below the visible portion of the display window. If both tests are negative, the entire segment is on display in the display window, and no scrolling is necessary to display it fully. If both tests are positive, then the segment is too large for display in the display window. The segment is clipped on both the top and the bottom. In these two cases, no scrolling is done.

If the top is above the segments on display, but the bottom is not below the segments on display, then the display window is scrolled up so that the top of the current segment is shown at the top of display window. This may be done by adding the value of top (a negative number—indicating the scrolling is up) to VerticalScrollPos (element 645). If the bottom of the segment is below the visible area, but the top of the segment is not above the visible area, the display window may be scrolled down by the amount that the bottom is below the bottom of the display window (element 650); that is, by the amount (bottom—the height of the display window). This may be done by increasing the VerticalScrollPos by the amount (bottom—the height of the display window).

Functions bottom (element 660) and top (670) may operate to scroll the display to place the current segment on the bottom or top of the display window. Both may call GetTopAndBottom (elements 665 and 675) to obtain the scrolling of the segment relative to the current display. The top function then adds the value of "top" to the vertical scroll position. In effect, it scrolls the display window to position the top of the current segment at the top. The function bottom changes the vertical scroll position by the amount (bottom—the height of the display window). This is the amount (positive or negative) that the bottom of the current segment is below the bottom of the display window. It scrolls the display window to position the bottom of the current segment at the bottom of the display window. Similarly, in response to a user's manipulating a scroll bar on one of the panes of text, a displayer of segmented parallel text may increase or decrease VerticalScrollPos by the amount of movement of the scroll bar.

The algorithm of FIG. 6 is for illustration and not limitation. In other embodiments, other algorithms may be used to determine the current segment and to determine the contents of the display windows as may occur to those of skill in the art.

FIGS. 7 through 10 illustrate additional embodiments of example displays produced by an interface for the display of portions of bodies of segmented parallel text. Display 700 includes panes 705 and 710. Each pane contains multiple segments. One segment of each pane, the current segment, is emphasized, segment 715 in pane 1 and segment 720 in pane 2. The emphasis may mark or distinguish the segment from other segments of the body of text in the pane. The emphasized segments are corresponding segments. In the embodiments of FIG. 7, the emphasis is performed by highlighting.

Display 700 includes a variety of navigation controls to enable a user to navigate through the text in either pane of text. Scroll bars 725 enable a user to scroll through the text in a pane. In some embodiments, scrolling may not affect the designation of the current segment, even if the scrolling places it outside of the display area of a pane. In other embodiments, the scrolling may effect the designation of the current segment. In some embodiments, scrolling so that the current segment is no longer visible results in the selection of a new current segment. In further embodiments, a new segment may be selected as the current segment even though the old segment remains on display. For example, if the scrolling moves the current segment from the middle of the pane to the top, another segment in the middle of the pane may be selected as the current segment and emphasized.

In some embodiments, the scrolling of the panes may be individual. Scrolling in one pane may not affect the display in the other. In other embodiments, the scrolling may be simultaneous. Scrolling in one window may automatically scroll the text in the other pane by the same amount. In still other embodiments, the scrolling may be partly individual. When, however, the scrolling in a pane moves the currently emphasized segment out of the pane, another segment may be selected as current and emphasized in the pane. The display of the other pane may then be adjusted to display the segment corresponding to the new current segment, and the corresponding segment may be emphasized. In many embodiments, some combination of these modalities may be offered.

Navigation mode buttons 745 may control a user's interaction with navigation modes. The navigation modes may be used to set one or more bookmarks in the text and to move to the bookmarked regions. In the embodiment of FIG. 7, display 700 may provide a single bookmark to matching segments on both panes. The index of the segment will be referred to as the home index. In other embodiments, the displayer may maintain one bookmark for each pane or other area of display of a body of parallel text. In some embodiments, there may be two navigation modes, designated "read" and "browse."

"Browsing": the current index and the home index may (and usually do) differ. Navigation commands do not change the home index. In navigation mode, the left and middle navigation mode buttons are active. A user may return to the segment of the home index (the middle button of navigation mode buttons 745) or may move the home index to the current index (the left button of navigation mode buttons 745). In some embodiments, the display may present an "are you sure" dialog box, after receiving a command to change the home index, in order to prevent the user from loosing the user's place in the text. Both of these commands may switch the navigation mode to reading mode. In further embodiments, using a navigation mode button to return to the segment of the home index may result in that segment being set as the current segment. That segment may be emphasized and shown in the display window.

In the button icons, the dot represents the home index and the box with "xxxx" represents the current segment. In the example of FIG. 7, the dot appearing above the current segment index represents that the segment of the home index is before the current segment. When the home index is after the current segment, the graphic indicating the current segment may be above the graphic representing the home index and the arrows may be pointing in the opposite direction.

"Reading": the current index and the home index have the same value. Small navigation commands change both the current index and the home index to the same new value. The left and middle buttons of the navigations buttons 745 are not active. The rightmost button of buttons 745, a radio button, is set to "reading." The navigation mode may be changed to browsing by clicking the "browsing" option of the radio button. Large navigation commands change the navigation mode to browsing, but do not change the home index. A small navigation command changes the current segment to a segment that is visible in pane 705 or 710 or lies just below or just above the current segment. All other commands that change the current segment are characterized as large navigation commands.

Bottom 760, Prev 750, Next 755, and Top 762 operate as the buttons with the same names in FIG. 1. Prev 750 decreases the index of the current segment by one, except when the current segment is the first segment. Next 755 increases the index of the current segment by one, except when the current segment is the last segment. Bottom 760 moves the current segment to the bottom of the pane, and top 762 moves the current segment to the top of the pane.

Segment indicator 765 displays the index of the current segment. The index may help users to communicate with other users reading or the same parallel segmented text. The users could be, for example, members of the same reading club or in the same school class. In such a situation users would probably find it useful to refer to specific portions of the text. In order to facilitate this, a parallel text displayer may display the current position (represented graphically by the highlights) as a number. In addition, in some embodiments, a parallel text displayer may display the static page number and/or chapter of the current segment, when the information is available.

Figure 10:
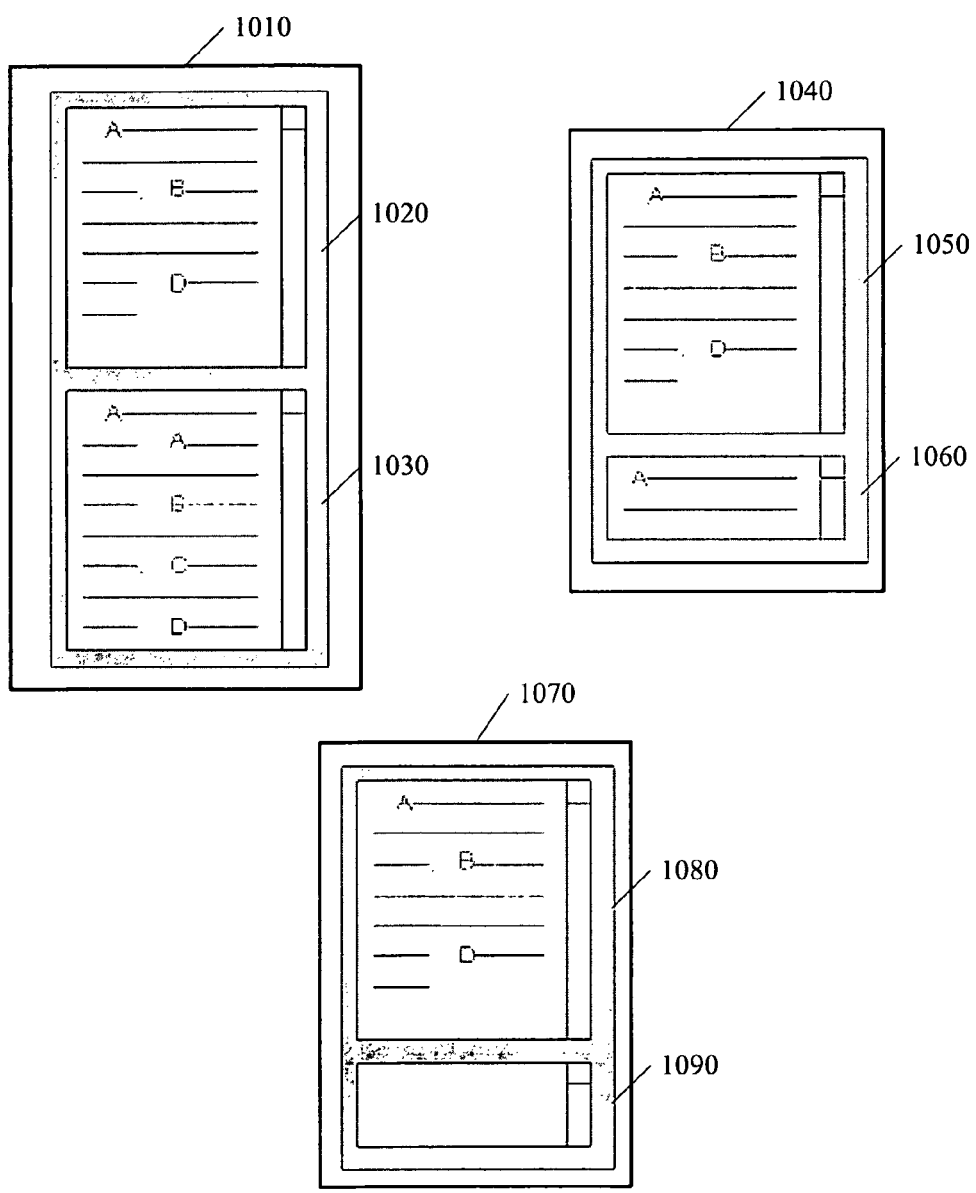
FIG. 10 depicts example layouts for the display of bodies of segmented parallel text.

The controls of display 700 also include layout button 730. In the embodiment of FIG. 7, a user may click the layout icon to change the layout from a horizontal (side-by-side) to a vertical (stacked) layout of the panes. In many embodiments, a user may choose to have one of the vertically arranged panels a different size from the other. For example, the bottom panel may contain only a single segment, the segment matching the current segment in the target text. FIG. 10 illustrates vertical layouts.

Switch text icon 735 may control the assignment of bodies of texts to panels. Clicking text icon 735 may interchange the panes used to display the two bodies of parallel segmented text. For example, the clicking may switch the panel used to display reference text and the panel used to display target text. In many embodiments, the user may designate bodies of text as target text or reference text. Target text may be the text the user may primarily concentrate on. The other body or bodies of text are reference text. For example, a user may wish to attempt to figure out the meaning of the text in an unfamiliar language by reading it along with the translation in a familiar language. The reader may designate the unfamiliar language as target text and the familiar language as reference text. In these embodiments, the switch text icon 735 may be used to switch the designation of a body of text from reference to target.

Speech icon 740 may generate speech for designated text. In some embodiments, the designated text is the current segment of the target pane. In many embodiments, a user may select words for speech, for example, a mouse drag. In some further embodiments, only words selected from the target pane may be selected for speech. In many further embodiments, whenever a word is being spoken, it will be highlighted. In some of these many further embodiments, the highlight of the current segment, the highlight of words selected with a mouse drag, and the highlight for a word for a word being spoken will all be distinct. If a word being spoken is also selected and/or is also in the current segment, only the highlight used for spoken words is evident. If a word is not being spoken but is both selected and in the current segment, then only the highlight used for currently selected words will be evident. The stepping highlight makes a convenient default selection for applying text-to-speech functionality. A simple gesture such as a button click or key press may cause the current target text segment to be converted to audible speech.

The icons and other features of FIG. 1 and FIG. 7 are for illustration and not for limitations. Other embodiments of an apparatus to display bodies of parallel segmented text may contain additional icons, omit some of the icons presented in FIG. 1 or FIG. 7, or use different displays of icons to represent the same functionality. In some embodiments, more than two bodies of parallel segmented text may be displayed simultaneously. In a few embodiments, some bodies of parallel text may not be displayed. For example, in some embodiments with two bodies of parallel text, a user may have an option of displaying only a single body of text. As another example, there may be three bodies of parallel text with two bodies on display. The reader may be able select which bodies of text to be displayed at any particular time. Some embodiments may lack speech. Some embodiments may display UI controls that allow the user to quickly go to a specific segment (by number), chapter, or page.

In other embodiments, methods for emphasizing text may include crosshatching, a segment mark, differentiated font—a larger size font; a different font; fonts with different characteristics, such as bold, italicized, or underlined; drawing a boundary, such as a rectangular boundary, around the portion of text; a blinking background, with black highlights blinking on and off; a display similar to a marquee; a rotating black or red border; a shimmer, in which text moves in and out of focus; and sparkles moving through the text. Methods for emphasizing text may also include other uses of graphical elements to point to the portion of text; and other methods of visually distinguishing a portion of text that may occur to those of skill in the art.

In a few embodiments, a user may request the translation of a selected portion of a body of parallel text other than the current segment. In further embodiments, holding the mouse over (hovering over) a word in the target pane causes a small pop up window to appear in (balloons) a translation of that word in the language of the primary reference text. Hovering over a word in a reference pane balloons a translation of that word in the language of the target text. The pop up window (balloon) used to display the translations may also contain two small graphics. Hovering over one of these graphics may balloon the definition of the word in the language of the target text and hovering over the other may balloon the definition of the word in the language of the primary reference text.

In order to accommodate users who prefer larger or smaller type, the size of the text is adjustable in some embodiments. Similarly, a display may allow a user to adjust the ratio of font size to window size. In further embodiments, the text may be reflowed whenever the font size or window size changes. Without this feature, narrowing the window may result in clipping the text, and widening the window may result in wasted space. Reflowable documents may not have fixed last words for each line. If the pane is made larger or the font made smaller then the text is re-flowed (wrapped) to fill the extra space. If the pane is made smaller or the font is made larger then the text is re-flowed (wrapped) so that no portion of the text is clipped by the vertically oriented boundaries of the panes.

In some embodiments, the use of a stepping highlight or other emphasis in a display of parallel text such as the display of FIG. 7 may preserve the paragraphs of the original text while clearly indicating a reader's current position in the text in the panes of the display. Since no additional white space needs to be added, the text can presented with only the author's white space. In further embodiments, the elimination of the additional spacing may reduce the effort needed to produce a display of parallel segmented text. Further, in some embodiments, preserving the division into paragraphs of the original may reduce a reader's temptation to look at a translation of a segment before the reader attempted a translation. The positioning of the current segment in a paragraph of text may direct the reader to focus on the paragraph, rather than jumping to the translation of the current segment in another pane.

Figure 8:
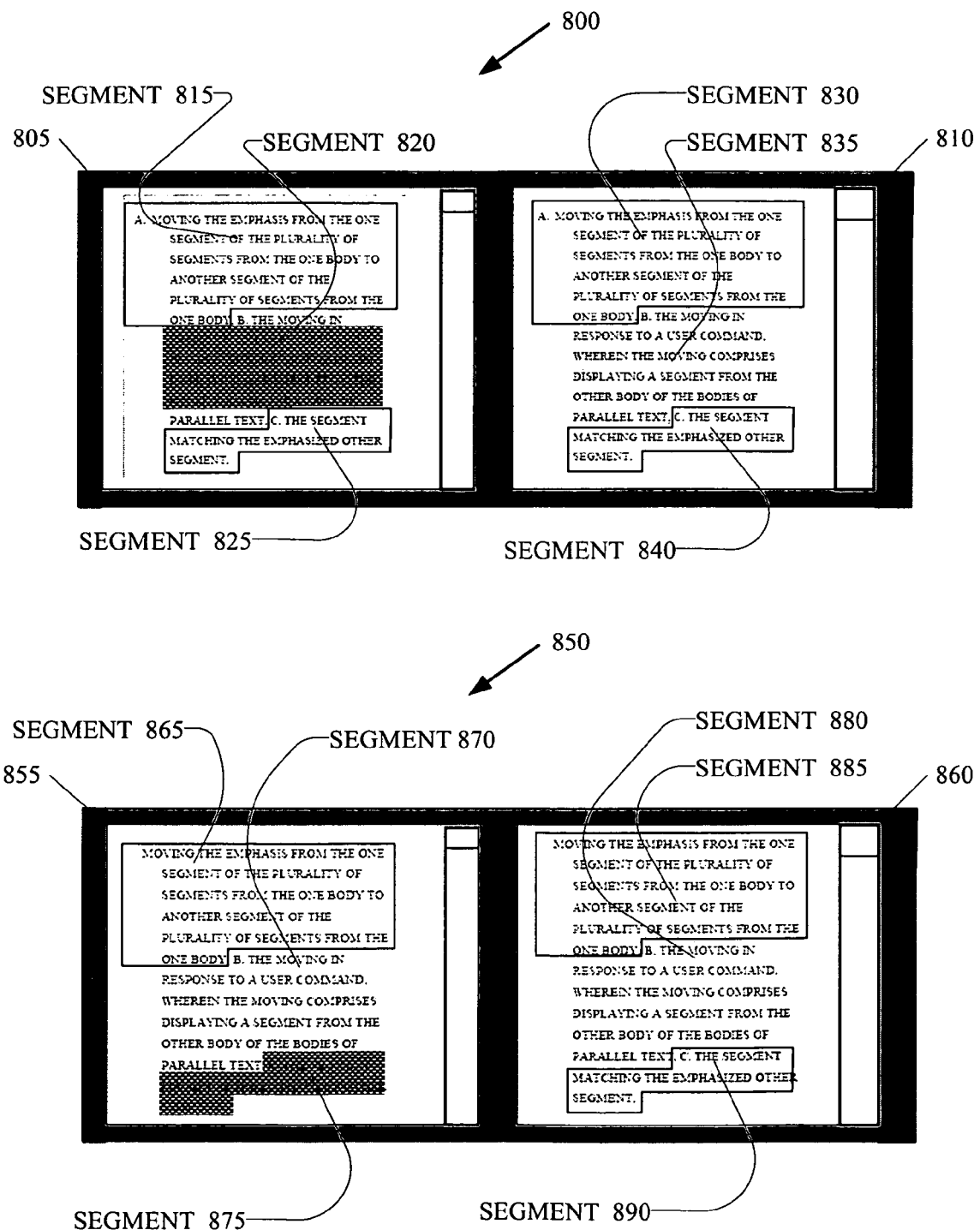
FIG. 8 illustrates an example display of moving from one segment of parallel text to another.
Figure 9:
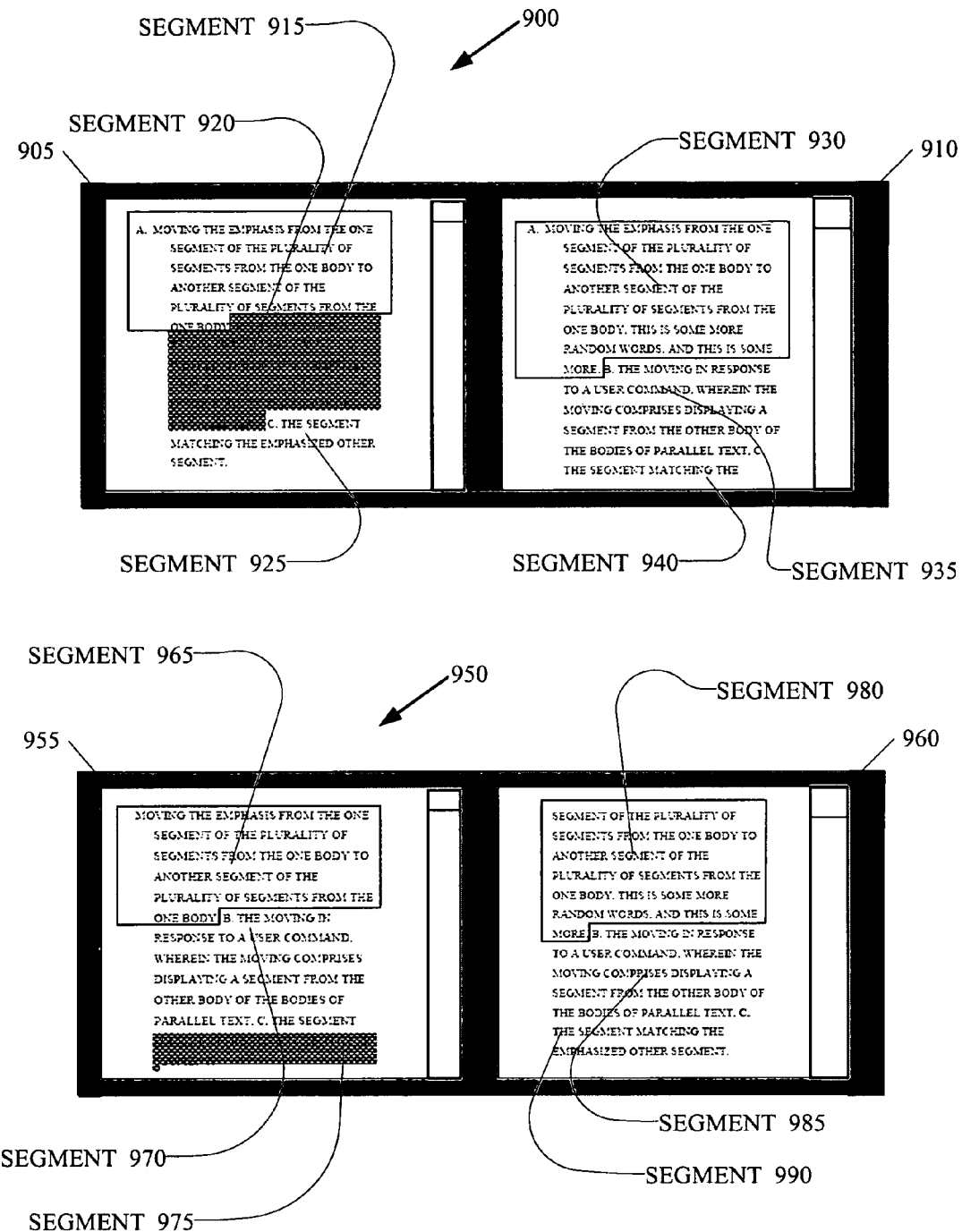
FIG. 9 depicts an example display of the automatic scrolling of an emphasized segment of parallel text.

FIGS. 8 and 9 depict example changes to a display of parallel segmented text as a result of changing the current segment. In both FIGs., the change in the current segment may occur in response to a Next command. In the example of FIG. 8, the change in current segments does not change the text displayed. FIG. 8 contains two displays of bodies of segmented parallel text, display 800 and display 850. Display 800 represents an example display before increasing the index of the current segment, and display 850 represents an example display of the text after increasing the index of the current segment. Each display contains two panes (pane 805 and pane 810 in display 800; and pane 855 and 860 in display 850). Each pane contains three segments. For clarity, the top and bottom segments in each pane are outlined. Pane 805 contains segments 815, 820 and 825 from one body of parallel text. Segment 825, the middle segment, is emphasized by crosshatching. Pane 810 contains segments 830, 835 and 840 from another body of parallel text. Segment 835 is emphasized by crosshatching. The segments 815, 820 and 825 match the segments 830, 835 and 840 respectively.

In display 850, the current segment is the segment following the current segment in display 800, such as after a Next command. Pane 855 contains segments 865, 870, and 875. These are the same segments as segments 815, 820, and 825 from pane 805 of display 800. In display 850, however, the emphasis is on segment 875, the last segment. In going from display 800 to display 850, the emphasis was removed from the middle segment and placed on the last segment. Similarly, pane 860 contains segments 880, 885, and 890, the same segments as in pane 810 of display 800. In pane 860, the emphasis was removed from the middle segment and placed on the last segment. In FIG. 8, the change in current segments did not affect the segments shown. The same segments are shown in pane 855 as in pane 805, and the same segments are shown in pane 860 as in pane 810.

The method of FIG. 8 is for illustration and not limitation. In some embodiments, both windows may scroll whenever the current segment is changed to leave the current segment in a fixed position on the page.

In the example of FIG. 9, the change in the current segment causes a scrolling of one of the panes. FIG. 9 contains two displays of bodies of segmented parallel text, display 900 and display 950. Display 900 represents an example display before advancing to the next segment, and display 950 represents the display after advancing. Each display contains two panes (pane 905 and pane 910 in display 900; and pane 955 and 960 in display 950). Each pane contains three segments. For clarity, the top segment of the four panes is outlined. Pane 905 contains segments 915, 920 and 925 from one body of parallel text. The three segments are displayed in full. In the display of FIG. 9, segment 925, the middle segment, is emphasized by crosshatching. Pane 910 contains segments 930, 935 and 940 from another body of parallel text. Segments 930 and 935 are displayed in full, but segment 940 is only partially displayed. Segment 935 is emphasized by crosshatching. The segments 915, 920 and 925 respectively match the segments 930, 935 and 940 respectively.

In display 950, the current segment is the segment following the current segment in display 900. In the display, pane 955 has not scrolled from its position in display 900. Pane 955 contains segments 965, 970, and 975, the same segments as segments 915, 920, and 925 from pane 905 of display 900. The position of the segments in pane 955 has not changed. In pane 955, the emphasis was removed from the middle segment (segment 970) and placed on the last segment (segment 975).

In contrast, the change in current segment between pane 930 and pane 960 is accompanied with a scrolling of the display of the pane. Pane 960 contains segments 980, 985, and 990, the same segments as in pane 910 of display 900. Again, in pane 960, the emphasis was removed from the middle segment (segment 985) and placed on the last segment (segment 990). Because, without scrolling, segment 990 could not be displayed completely in pane 960, the pane was scrolled down one line. As a result, segment 990 is displayed in full in pane 960. In addition, the top segment in pane 960, segment 980, is missing its top line as compared with the display of pane 910. In the embodiment of FIG. 9, changing to the next segment was accompanied by scrolling of one of the two panes to display both new current segments in full. This process is referred to as automatic scrolling.

The method of FIG. 9 is for illustration and not limitation. Some embodiments may use forms of emphasis other than highlighting. Many embodiments may display only a single body of parallel text or may display more than two. In some embodiments, all windows may scroll whenever the current segment is changed to leave the current segment in a fixed position on the page. In other embodiments, scrolling may not be automatic.

Turning to FIG. 10, depicted are example layouts for the display of bodies of segmented parallel text. Each layout of FIG. 10 depicts two panes arranged vertically. The panes may display text from bodies of parallel text. The displays differ in the amount of text displayed in the bottom pane. FIG. 10 contains displays 1010, 1040, and 1070. Top panes 1020 of display 1010, 1050 of display 1040, and 1080 of display 1070 are of the same size and display the same amount of text. In display 1010, the bottom pane 1030 is the same size as top panes 1020. In display 1040, bottom pane 1060 displays a single segment of text. In display 1070, bottom pane 1090 displays no text. In some embodiments, a user may move between side-by-side panes and top-and-bottom panes by interacting with icons such as layout icon 730 of FIG. 7. In further embodiments, the user may be able to choose the form of vertical layout by going to a preferences menu or otherwise interacting with a graphical user interface.

Figure 11:
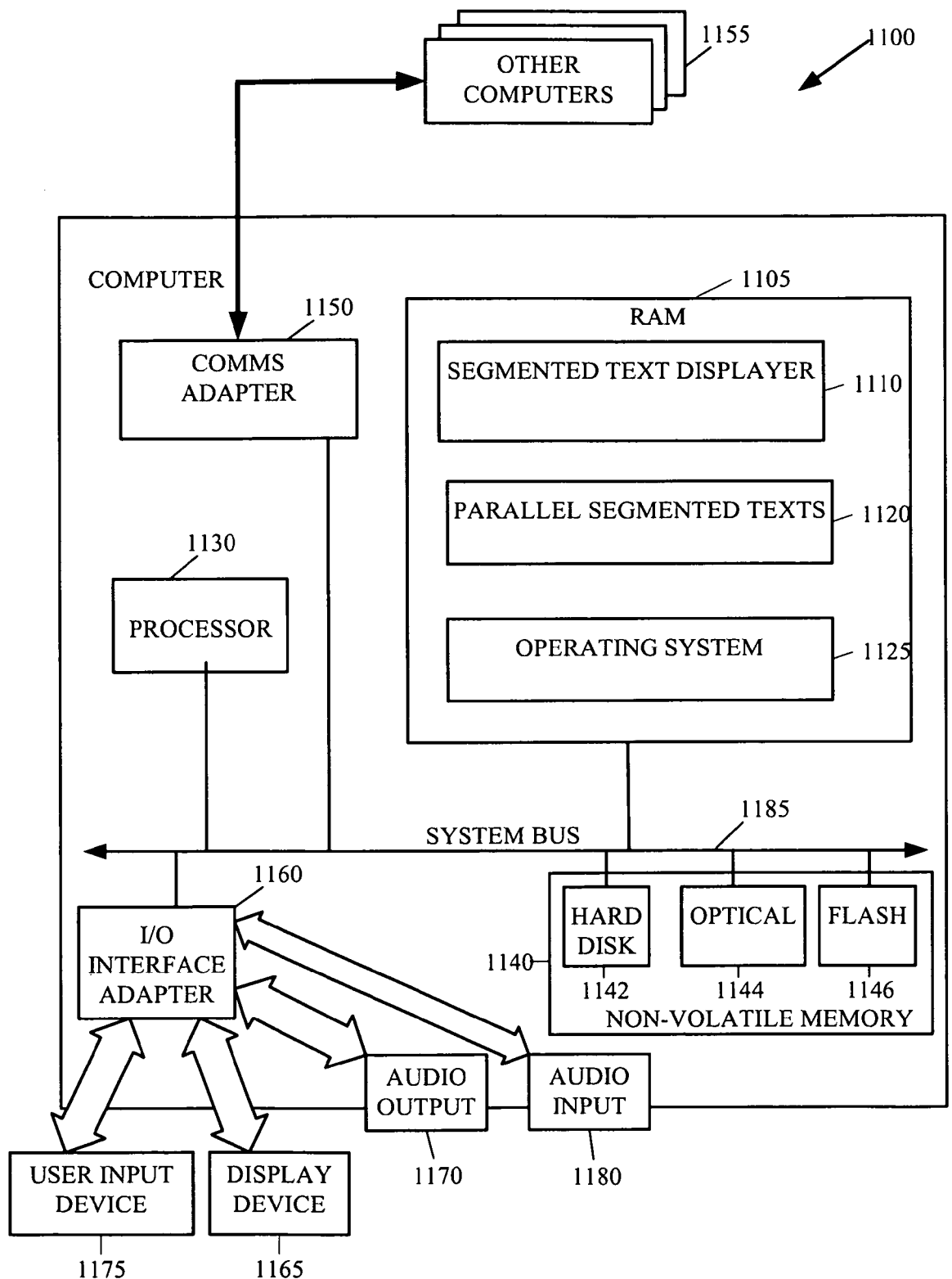
FIG. 11 depicts an embodiment of a computer capable of displaying bodies of segmented parallel text.

FIG. 11 depicts an embodiment of a computer 1100 capable of displaying text from bodies of segmented parallel text that includes random access memory (RAM) 1105, a processor 1130 or CPU, non-volatile memory 1140, a communications adapter 1150, and an Input/Output (I/O) interface adapter 1160 connected by system bus 1185. Stored in RAM 1105 are segmented text displayer 1110, parallel segmented text 1120, and operating system 1125.

Segmented text displayer 1110 may comprise computer program instructions for displaying text from bodies of segmented parallel text in accordance with embodiments of the invention. Segmented text displayer 1110 may obtain the segments by accessing parallel segmented texts 1120. In some embodiments, segmented text displayer 1110 may produce a display such as the display of FIG. 1 or the display of FIG. 7. Segmented text displayer 1110 may display multiple segments of text from one of the bodies in one area, such as a pane or window. Segmented text displayer 1110 may emphasize one of the segments, the current segment. In many embodiments, segmented text displayer 1110 may simultaneously display one or more segments from another of the bodies of parallel text in another area. The segments may include a segment matching the emphasized segment. In further embodiments, segmented text displayer 1110 may also emphasize the matching segment.

Segmented text displayer 1110 may execute user commands to move to a designated segment of the first body and set the designated segment as the new current segment. As part of the execution, segmented text displayer 1110 may remove the emphasis from the previous current segment and place it on the designated segment of the first body of parallel text. Segmented text displayer 1110 may also display a segment of the other body of parallel text which matches the new current segment of the first body.

Parallel segmented texts 1120 may contain the contents of bodies of parallel segmented text. In some embodiments, parallel segmented texts 1120 may contain an index to the matching segments of the parallel segmented text. In many embodiments, parallel segmented texts 1120 may also contain location information, such as the line numbers, page numbers, section numbers, or chapter numbers of the segment in a print version of the text.

Operating system 1125 may comprise UNIX™, Linux™, Microsoft Windows™, AIX™, IBM's i5/OS™, or other operating systems useful for displaying bodies of segmented parallel text as will occur to those of skill in the art. In some embodiments, operating system 1125 may provide services to other applications to enable them to display windows of information on display device 1165. The windows may contain various graphical elements similar in appearance and function to mechanical buttons and to portions of a page of text. In many embodiments, operating system 1125 may provide a mechanism to notify other applications when a user provides input to computer 1100 via user input device 1175. In several embodiments, operating system 1125 may also provide a mechanism to enable other applications to produce sound through audio output device 11170.

Segmented text displayer 1110, parallel segmented texts 1120, and operating system 1125 (components of software) are shown in RAM 1105 in FIG. 11, but many components of such software may be stored in non-volatile memory 1130 also. Further, while the components of such are shown simultaneously present in RAM, in some other embodiments, only some of the components of RAM 1105 may be present at any given time. In one paradigm of computer operation, non-volatile memory may contain document files, including parallel segmented texts 1120; application program files, including segmented text displayer 1110, operating system extensions, and files of operating system 1125. Portions of operating system 1125 may be loaded into RAM 1105 as a part of the normal power up sequence of the personal computer. Similarly, portions of segmented text displayer 1110, parallel segmented texts 1120, and of operating system extensions may be loaded into RAM 1105 during application start.

Non-volatile computer memory 1130 may be implemented as a hard disk drive 1142, optical disk drive 1144, electrically erasable programmable read-only memory space (EEPROM or Flash memory) 1146, RAM drives (not shown), or as any other kind of computer memory as will occur to those of skill in the art. Communications adapter 1135 may implement the hardware level of data communications between computer 1100 and other computers, such as other computers 1155. The data communications may occur directly or through a network and may include communicating with a virtual universe client program or web browser. Such data communications may be carried out through serially through RS-1132 connections, through external buses such as USB, through data communications networks such as IP networks, and in other ways as will occur to those of skill in the art. Examples of communications adapters include modems for wired dial-up communications, Ethernet (IEEE 11002.3) adapters for wired network communications, and 11002.111a/b/g/n adapters for wireless network communications.

I/O interface adapter 1160 implements user-oriented I/O through, for example, software drivers and computer hardware for controlling output to display devices such as display device 1165 and audio output device 1170 as well as user input from user input device 1175 and audio input device 1180. User input device 1175 may include both a keyboard and a mouse. Some embodiments may include other user input devices such as speech interpreters, bar code scanners, text scanners, tablets, touch screens, and/or other forms of user input devices. Audio output 1170 may include speakers or headphones and audio input device 1180 may include a microphone or other device to capture sound.

The computer and components illustrated in FIG. 11 are for explanation, not for limitation. In some embodiments, embedded systems, PDAs, cell phones, BlackBerries® and other computing devices may display text from bodies of segmented parallel text. In several embodiments, a specific purpose text-reader, such as an e-book, may display text from bodies of segmented parallel text. In many embodiments, modules to display text from bodies of segmented parallel text may be implemented in hardware, firmware, or in state machines or may form a component of an operating system. In several embodiments, a computing device may contain two or more processors. In various embodiments, a computing device may use point-to-point interconnects to connect processors or to connect a processor and another element of the computing system.

Figure 12:
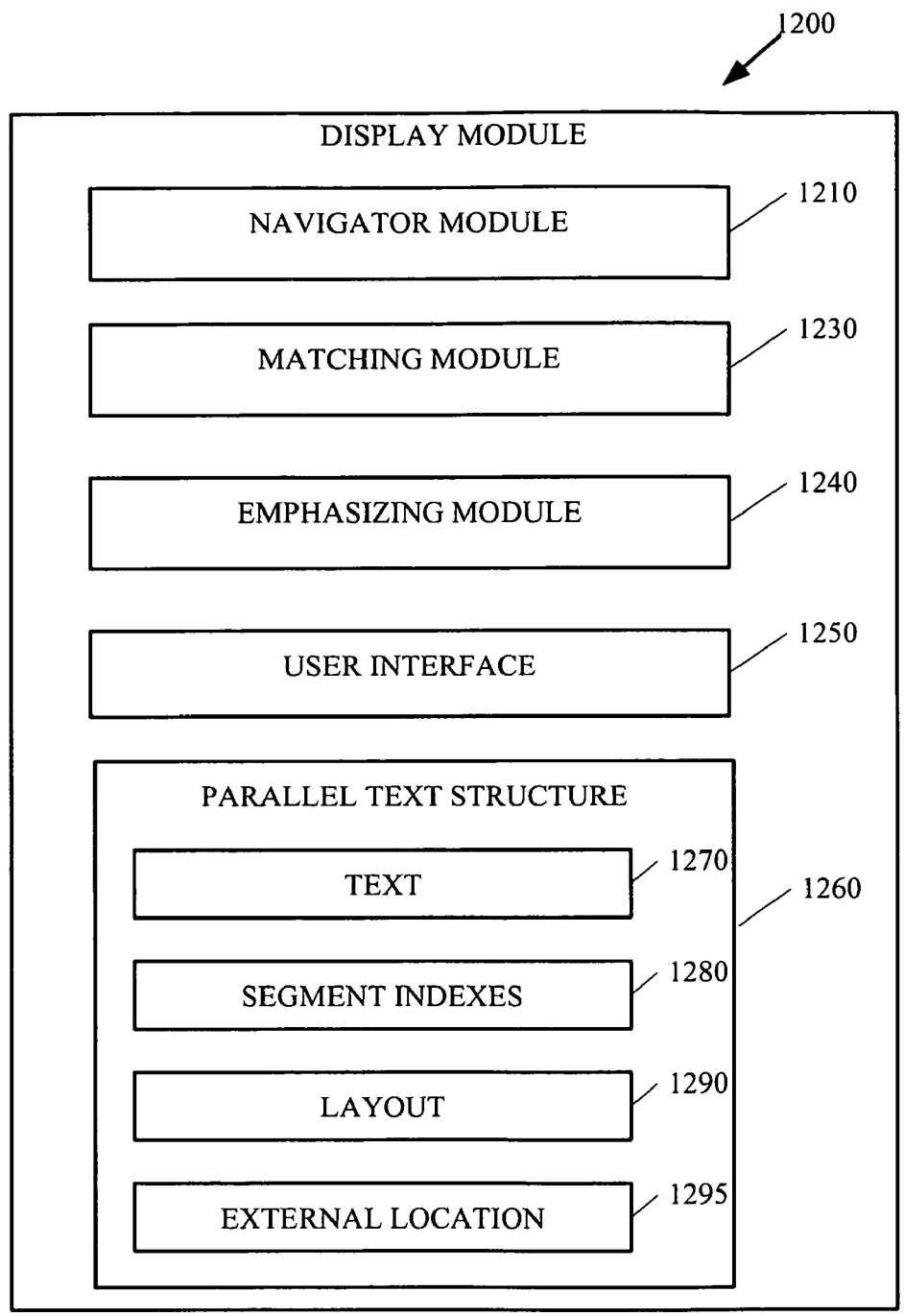
FIG. 12 depicts an embodiment of an apparatus to display bodies of segmented parallel text.

For further explanation, FIG. 12 sets forth a block diagram illustrating an exemplary apparatus 1200 for displaying bodies of segmented parallel text. Display module 1200 includes navigator module 1210, matching module 1230, emphasizing module 1240, user interface 1250, and parallel text structure 1260. Navigator module 1210 may determine which portion of a body of parallel segmented text to display in a display window and may scroll the display window to show the desired portion of text. The determination may be in response to a user command. The command may designate a segment to be made the current segment, such as a command to select the previous segment or the next segment. In response, navigator module 1210 may select a portion of text which includes the designated current segment. In some cases, navigator module 1210 may leave the portion of text displayed unchanged. For example, the user may designate a segment which is currently on display.

The command to navigator module 1210 may instead explicitly designate a portion of the text. For example, the user may request a move to the next page or the next chapter. In this case, navigator module 1210 may display the portion of text designated. navigator module 1210 may also select one of the segments in the portion of text as the current segment. Navigator module 1210 may, for example, select the first or last segment on the page or chapter. The segment may be a default segment. For example, when a user opens the parallel segmented text, navigator module 1210 may locate the segments that had been selected as current at the end of the last session.

Matching module 1230 may locate corresponding text in another body of parallel text for display by displayer 1200. In many embodiments, matching module 1230 may use indexes to locate the corresponding text. The segments may be indexed and corresponding segments may have the same indexes. The display from the other body of parallel text may consist only of the matching segment, or may consist of a portion of the other body including the matching segment. Displayer 1200 may simultaneously display the text selected from one body of parallel text by selection module 1220 and the text including the matching text from the other body.

Emphasizing module 1240 may emphasize the current segment in at least one of the bodies of parallel segmented text. In many embodiments, emphasizing module 1240 may emphasize corresponding or matching segments of text in the other bodies of parallel segmented text on display. The emphasis may mark or distinguish the segment from other segments of the body of text.

User interface 1250 may receive commands from users about the display of text by displayer 1200. The user may request a move to a particular segment, a display of a particular portion of text, or some parameters of the display of text. User interface 1250 may describe the options to the user. User action on user interface controls presented by user interface 1250 may cause the emphasis to be removed from the current segment or segments and applied to another segment or segments. Through user interface 1250, the user may step through the segments of bodies of parallel text a segment at a time. With each step, the highlight or other emphasis will be removed from the current segment or segments and placed on the next segment or segments.

Parallel text structure 1260 contains a representation of bodies of parallel text for display by displayer 1200. The representation may include a representation of the text itself and ancillary information. The representation may resemble the representation of FIG. 4. Parallel text structure 1260 includes text 1270, segment indexes 1280, and layout 1290, and external location 1295. Text 1270 may contain a representation of the text of bodies of parallel text. In many embodiments, text 1270 may be divided into segments. For example, text 1270 may represent segmented text as an array of strings. Segment indexes 1280 may contain an index of the segments. In some embodiments, an entry in index 1280 for a segment in one body of text may indicate the location in text 1270 of the segment of text, and may indicate the matching segments in the other bodies of text. In many embodiments, the parallel texts are divided into the same number of segments, and the matching segments are in order. In those embodiments, an entry of an index in segment index 1280 may indicate the locations of the segments with that index in each of the bodies of parallel text. The index may be numerical, with segments numbered consecutively starting at 0 or at 1. For example, the entry to index 5 may indicate the location in text 1270 of the sixth English segment and the matching sixth Spanish segment. Layout 1290 may contain information about the layout of the segments of text. In some embodiments, the layout information for a segment may be similar to array of rectangles 320 of FIG. 3. External location 1290 may contain information about the location of segments in the original text, such as the page number or chapter number. The information may be useful in discussing the text with others or in citing the text.

The modules of FIG. 12 are for illustration and not limitation. An apparatus for displaying bodies of segmented parallel text in accordance with embodiments of the invention may omit some of the modules shown, may include additional modules, or may contain different arrangements of modules. Some embodiments may omit a separate segment index. In a few further embodiments, each segment may be labeled with an entry of the index, such as a number to designate a segment. A displayer may find a matching segment in a body of parallel text by moving through the segments of the body until it reaches the segment with the same number or other element of the index. Several embodiments may omit external location information. Many embodiments may contain additional modules. For examples, a displayer may include a speech module to speak designated portions of text. In further embodiments, the speech module may produce synthesized speech from the selected text or may playback a recorded reading of the selected text. A displayer may also include a graphics module to illustrate the text by graphics or animation. The displayer may, for example, make use of animated lips, text balloons, character cast, graphics, pictures, or other devices that may occur to those of skill in the art.

Figure 13:
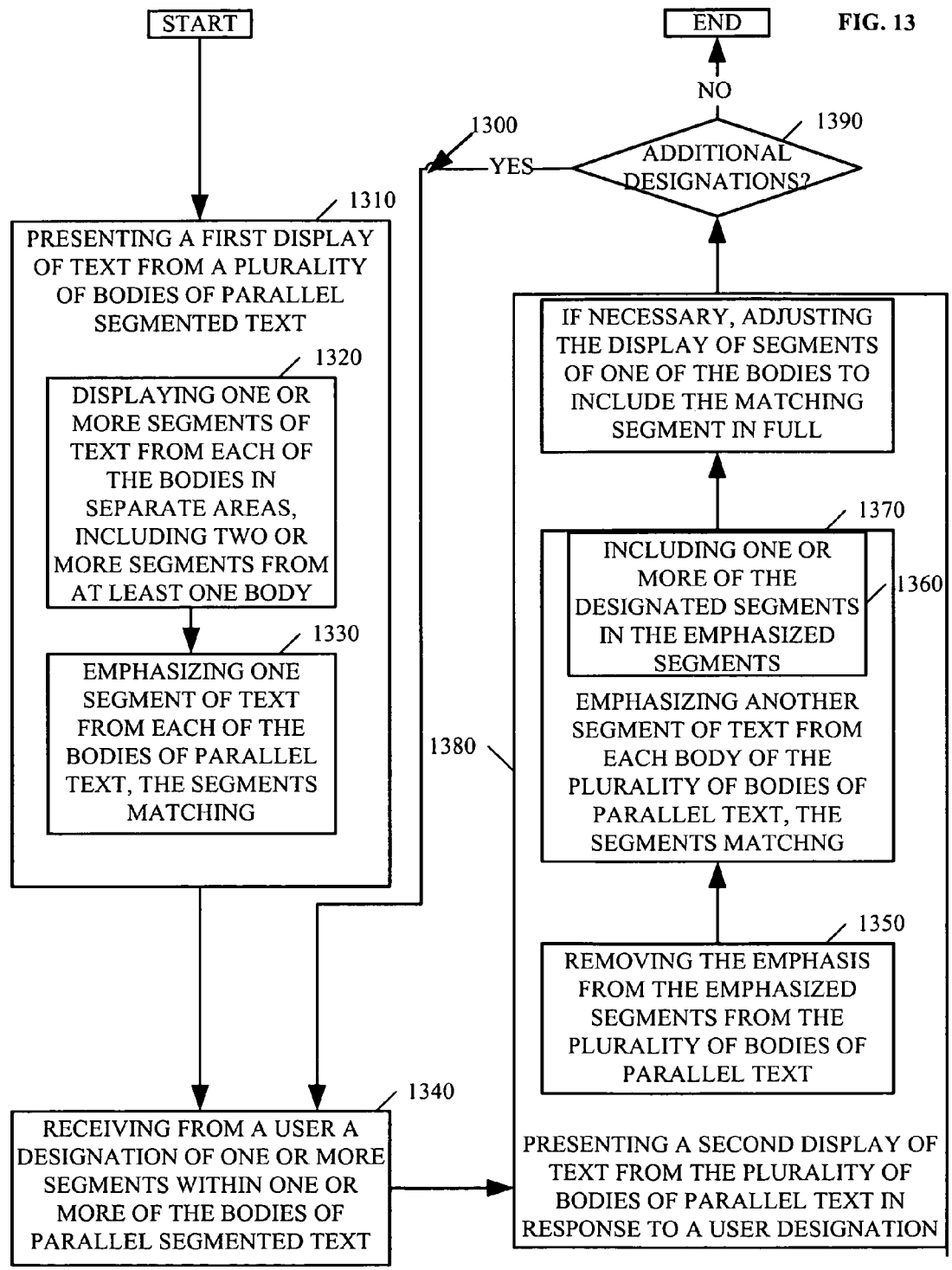
FIG. 13 depicts a flowchart of an embodiment of a method to display bodies of segmented parallel text.

FIG. 13 depicts a flowchart 1300 of an embodiment of a method to display text from bodies of segmented parallel text. The method of FIG. 13 may be performed by a displayer such as display module 1200 of FIG. 12. The method of FIG. 13 begins with presenting a first display of text from a plurality of bodies of segmented parallel text (element 1310).

The segments of each body may be displayed in a separate area, such as a separate window or pane. In addition, the display of text from one of the bodies of parallel segmented text may include two or more segments of text from the body of parallel segmented text (element 1320). The method includes emphasizing one segment of text from each of the bodies of parallel segmented text (element 1330). The emphasized segments may match. In many embodiments, the segment may be emphasized by highlighting.

The method of FIG. 13 includes receiving from a user a designation of one or more segments within one or more of the bodies of parallel segmented text (element 1340). Typically, a user designates one or more segments of text by issuing a command to move to the one or more segments. The user may desire to have the segments displayed in order to read them. The user may direct the display to show the next segment, to move to the next page, to move to the next chapter, to move to a bookmark, or otherwise to show a particular portion one or more of the bodies of text.

The method of FIG. 13 includes presenting a second display of text from the plurality of bodies of parallel text in response to the user designation of one or more segments (element 1380). In the second display for each body of parallel segmented text, the emphasis may be removed from the segments emphasized in the first display (element 1350) and placed on other segments (element 1360). The emphasized segments may include a segment or segments designated by the user (element 1370).

If necessary, the display of one of the bodies may be scrolled to include the matching segment in full (element 1380). FIG. 9 presented an example of automatic scrolling. If the user designates other segments of text, elements 1340 through 1380 may be repeated (element 1390). Otherwise, the method of flowchart 1300 may end.

The embodiment of FIG. 13 is for illustration and not for limitation. Other embodiments may add or subtract elements or perform them in a different order. In other embodiments, the method of display may include other elements. For example, the displayer may speak designated segments or other portions of a body of text, may display a translation of a designated portion of text, such as a word, in a pop-up window or other display area, or may include graphics to illustrate the text. The method may also include adjusting the format for the display, such as increasing the font size, changing the font, changing the size of the windows or panes, or changing the layout of the panes or windows. In some embodiments, text from less than all of the bodies may be emphasized. For example, the display may present text from two bodies of text. The current segment of one of the bodies may be emphasized, but no segment from the other body may be emphasized.

Figure 14:
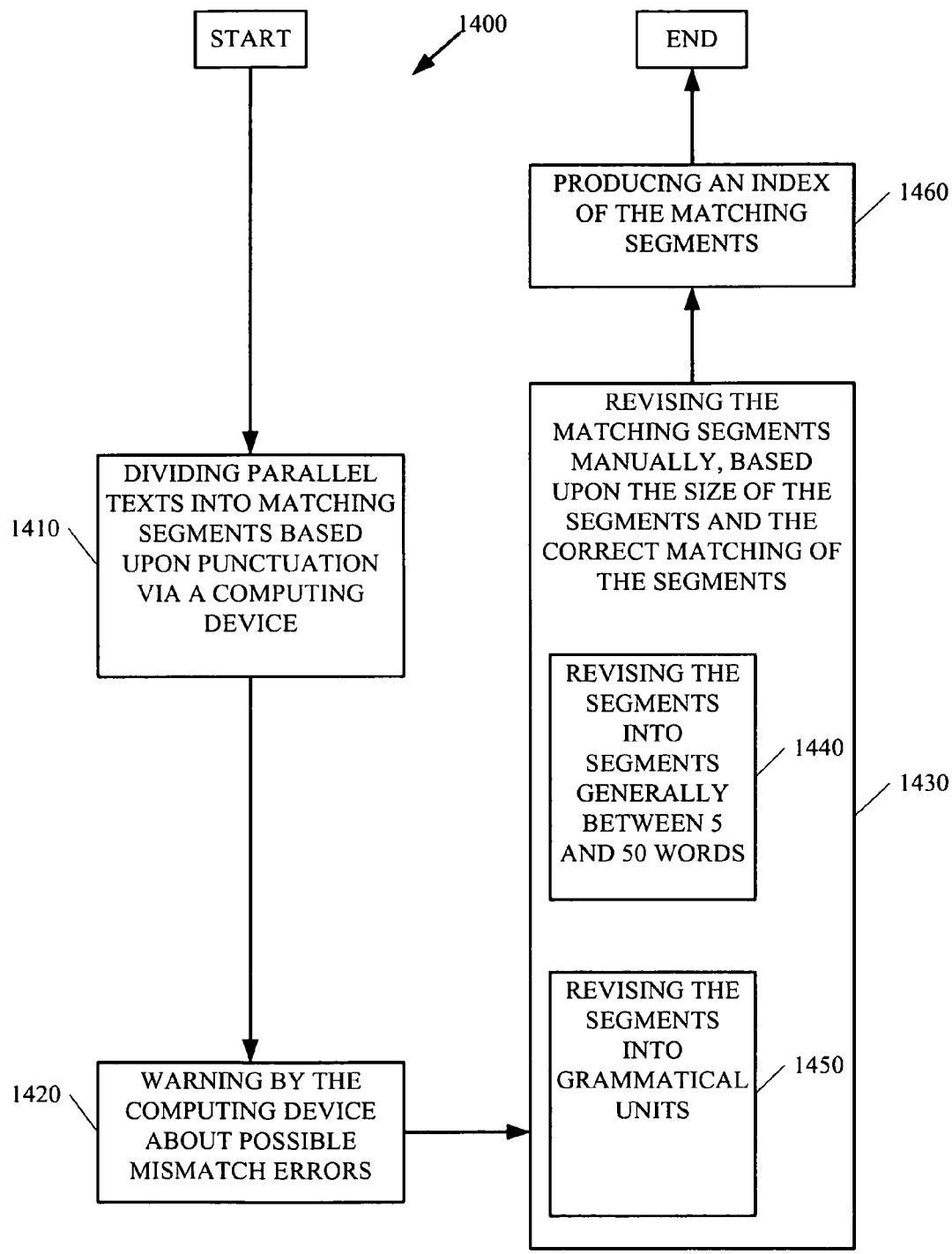
FIG. 14 depicts a flowchart of an embodiment of a method to divide bodies of parallel text into matching segments.

FIG. 14 depicts a flowchart 1400 of an embodiment of a method to divide bodies of parallel text into matching segment, a method that may be referred to as fusing. The method of FIG. 14 is a combination of automatic and manual segmenting. The method of FIG. 14 begins with dividing the bodies of parallel text into matching segments based upon punctuation (element 1410). The division may be performed by a computer or other computing device. For example, the computing device may separate the bodies of text into sentences terminated by a periods. Longer sentences may be further subdivided based upon clauses, terminated by commas, colons, semicolons, and dashes. The computing device may match the segments based on the punctuation marks and the word count of the segments.

The computing device may check the matches. It may, for example, compare punctuation marks or the number of words, or may check for known equivalents, such as proper names. The computing device may warn about possible mismatches (element 1420). For example, a segment of one body of parallel text ending with a period may not match a segment of another body ending with a comma. As another example, a 70-word segment of one body may not match a ten-word segment in another. Similarly, two segments may not match if one contains a proper noun and the other does not contain the noun or an equivalent.

The method of FIG. 14 also includes manually revising the matching segments (element 1430), based upon the size of the segments (element 1440) and the content of the segments (element 1450). A person dividing parallel text into segments may increase the size of properly matched segments by combining sets of two or more small segments into sets of matching single larger segments. Conversely, the person may divide properly matched larger segments into matching smaller segments. The person may try to produce segments that are generally between 8 and 70 words long.

The person may also correct errors in the matching. For example, the computing device may have formed a segment out of a sentence in one language, but divided the translation of the sentence into multiple segments. The computing device may have matched the complete sentence segment with one of the segments of the translation. The person may then combine the multiple segments of the translation into a single sentence or divide the sentence forming a single segment into multiple segments. In some embodiments, when the bodies of parallel text are translations, the person may attempt to select segment sizes most effective for learning a language. The person may avoid overly long segments, which may cause a reader to have difficulty in finding the word-to-word correspondence between two matching segments. Conversely, the person may avoid overly short segments. This size may make the key tapping needed to navigate through the text burdensome. In addition, the short divisions may hinder a reader's grasp of the meaning of larger portions of the text, such as sentences.

The method of FIG. 14 also includes producing an index of the matching segments (element 1460). The index may consist of numbering the segments of each body of parallel text, with the same number used to indicate corresponding segments. The index may indicate, for each number, the corresponding segment in each body of parallel text. After producing the index, the method of FIG. 14 may end.

The embodiment of FIG. 14 is for illustration and not for limitation. Other embodiments may add or subtract elements or perform them in a different order. For example, some embodiments may omit a computer-generated warning. A few embodiments may omit an index. In several embodiments, a manual revision may unite separated portions of phrases or clauses. For example, the manual revision may correct the separation of a preposition from its object in a prepositional phrase.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product for displaying bodies of segmented parallel text, the computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements for displaying bodies of segmented parallel text. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus to display text, the apparatus comprising:
a display;
memory;
means to present a first display of text from a plurality of bodies of parallel text, the bodies of parallel text divided into segments, the segments from each of the plurality of bodies of parallel text matched to the segments of the other bodies of parallel text, the means to present comprising:
    means to display from each body of the plurality of bodies of parallel text one or more segments of text from the body in a separate area and means to emphasize one segment of text from the one or more segments of text displayed in the separate area;
wherein:
    the emphasized one segments of text from each of the plurality of bodies of parallel text match; and
    the means to display text from one of the bodies of text comprises means to display a plurality of segments of text from the body of text;
a user interface to receive from a user a command to emphasize a different segment within the one of the bodies of text; and
means to present a second display of text from the plurality of bodies of parallel text in response to the receiving, the means to present the second display comprising:
    means to remove the emphasis from the emphasized one segment from each of the plurality of bodies of parallel text;
    means to emphasize another segment of text from each body of the plurality of bodies of parallel text, the means to emphasize comprising means to emphasize the different segment within the one of the bodies of text, wherein:
        the emphasized another segment of text from each of the plurality of bodies of parallel text match; and
    means to display the emphasized other segment of text from each body of the plurality of bodies of parallel text, the means to display comprising means to display the different segment.

* * * * *